United States Patent [19]
Pacher et al.

[11] Patent Number: 6,041,639
[45] Date of Patent: Mar. 28, 2000

[54] METHOD AND APPARATUS FOR STRETCH-FORMING AND SHEARING SHEET METAL

[75] Inventors: Glen C. Pacher; Alan T. Potter; Kevin A. Gillespy, all of Seattle, Wash.

[73] Assignee: The Boeing Company, Seattle, Wash.

[21] Appl. No.: 09/247,250

[22] Filed: Feb. 9, 1999

[51] Int. Cl.$^7$ .......................... B21D 25/02; B21D 28/00
[52] U.S. Cl. ................... 72/294; 72/302; 72/330; 72/296; 83/637
[58] Field of Search ............. 72/294, 302, 326, 72/331, 330, 337, 296; 83/637

[56] References Cited

U.S. PATENT DOCUMENTS

| | | | |
|---|---|---|---|
| 30,405 | 10/1860 | Humphrey | 72/329 |
| 3,211,034 | 10/1965 | Andris . | |
| 3,234,774 | 2/1966 | Margedant . | |
| 3,583,266 | 6/1971 | Kazuyoshi . | |
| 3,739,669 | 6/1973 | Seki . | |
| 4,104,941 | 8/1978 | Krueger | 83/637 |
| 4,945,954 | 8/1990 | Wehrly | 140/105 |
| 5,373,767 | 12/1994 | Weisser . | |
| 5,490,317 | 2/1996 | Kubert | 72/330 |
| 5,755,132 | 5/1998 | Sannwald | 72/294 |

FOREIGN PATENT DOCUMENTS

| | | | |
|---|---|---|---|
| 2426505 | 1/1980 | France | 72/329 |
| 225831 | 12/1984 | Japan | 72/294 |
| 553027 | 5/1977 | U.S.S.R. | 83/637 |

*Primary Examiner*—Daniel C. Crane
*Attorney, Agent, or Firm*—Brooks & Kushman P.C.

[57] ABSTRACT

A method and apparatus is provided for forming and shearing a sheet metal workpiece in a single operation. The method includes the steps of: (a) providing a stationary lower die half; (b) stretching the workpiece over the lower die half to stretch-form the workpiece; (c) providing a vertically movable upper die half including a laterally movable floating portion with a shearing edge; (d) moving the upper die half toward the lower die half; (e) moving the floating portion laterally as the upper die half is moved toward the lower die half in order to properly align the floating portion with the lower die half; and (f) shearing the stretch-formed workpiece between the shearing edge and the lower die half as the upper die half moves toward the lower die half.

16 Claims, 5 Drawing Sheets

METHOD AND APPARATUS FOR STRETCH-FORMING AND SHEARING SHEET METAL

TECHNICAL FIELD

The present invention relates to a method and apparatus for stretch forming and shearing a sheet metal workpiece using a single combined tool in a single operation.

BACKGROUND ART

The prior art approach to manufacturing sheet metal details, such as for manufacturing airplane components, includes issuing rectangular sheets of raw stock. In order to stretch form the sheet metal using National Aerospace Standard (NAS) 930, "stretch forming machines—airframe", for manufacturing an airplane component, such as a wing, excess material is required around the periphery of the sheet for sheet forming. The raw stock is stretch formed across a tool, then the raw stock is relaxed after forming, removing most of the force (load) from the sheet stock, then an operator employs one of several methods to index the stock to the tool. For indexing, drilled or punched holes establish the periphery of the sheet that is stretch formed to the contour. Usually these holes require an additional drilling operation outside the stretch form press. The holes are used to index the sheet to a second tool used for trimming the sheet to the desired periphery configuration.

The trimming operation may comprise hand routing, pin routing, shaping, blanking or routing with numerical controlled equipment. These are all operations separate from the stretch press operation, therefore, requiring additional steps and additional tools. Hand routing, for example, requires a template style tool and a hand-held router with cutting bits. Blanking requires a blanking die and a press to perform the blanking. Trimming with numerical controlled equipment can sometimes be performed without another tool, but the equipment is expensive and requires programming by qualified individuals. Therefore, it still requires another operation, even when additional tooling is not necessary.

It is desirable to provide a method and apparatus for forming and shearing a sheet metal workpiece in which the tooling requirements are minimized and the number of operational steps are minimized.

DISCLOSURE OF INVENTION

The present invention overcomes the above referenced shortcomings of prior art processes by providing a method and tooling concept which combines what is typically two separate tools and separate operations into a single tool and single operation using a stretch press with a bulldozer. A stretch forming tool is provided with shearing features for trimming the periphery of the stretch formed details of the workpiece.

More specifically, the present invention provides a method of forming and shearing a sheet metal workpiece including the steps of: (a) providing a stationary lower die half; (b) stretching the workpiece over the lower die half to stretch-form the workpiece; (c) providing a vertically movable upper die half including a laterally movable floating portion with a shearing edge; (d) moving the upper die half toward the lower die half; (e) moving the floating portion laterally as the upper die half is moved toward the lower die half in order to properly align the upper and lower die halves; (f) shearing the stretch formed workpiece between the shearing edge and the lower die half as the upper die half moves toward the lower die half.

The present invention also contemplates an apparatus including a stationary support with a lower die half secured to the stationary support. The lower die half includes a first alignment feature. First and second jaws are positioned on opposing sides of the lower die half for grasping opposing edges of a sheet metal workpiece. At least one of the jaws is movable for stretch forming the workpiece over the lower die half. A bulldozer straddles the stationary support, and includes a vertically movable portion. An upper die half is connected to the vertically movable portion. The upper die half includes a die mounting plate fixed to the vertically movable portion and a floating portion laterally movable with respect to the die mounting plate. The floating portion includes a second alignment feature engageable with the first alignment feature for moving the floating portion laterally for properly aligning the upper and lower die halves as the movable portion moves the upper die half toward the lower die half. The floating portion includes a shearing edge cooperable with a shearing portion of the lower die half for shearing the workpiece.

BEST MODE FOR CARRYING OUT THE INVENTION

Figure 1:
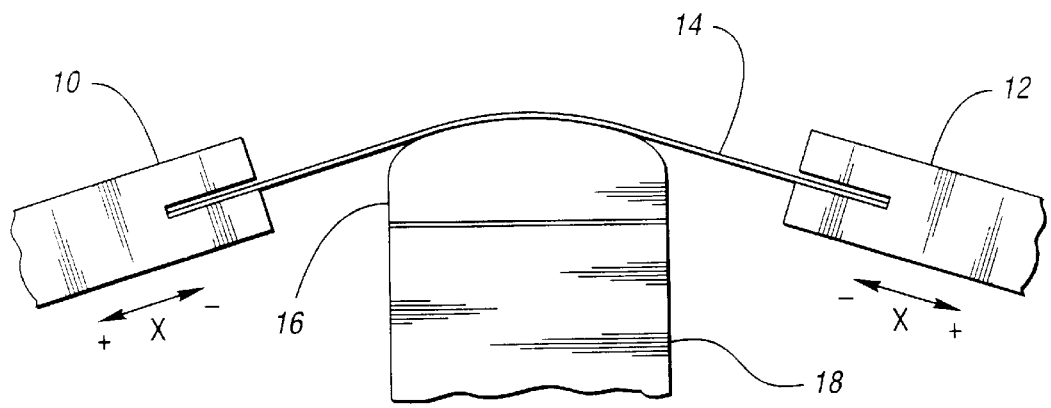
FIG. 1 shows a schematic partial side view of a prior art stretch forming operation.

Referring to FIG. 1, a schematic elevational view is shown of a typical prior art stretch form operation in which stretch press jaws 10, 12 hold the raw stock material sheet 14, and apply sufficient force to permanently deform the sheet. The forming is accomplished by pulling the sheet 14 over a stretch form die 16. The stretch form die 16 is supported by a die table or by a riser 18 between the die 16 and die table. The stretch forming process involves moving the jaws 10, 12 outward away from the die 16 simultaneously in the x-direction for stretching the sheet 14.

Figure 2:
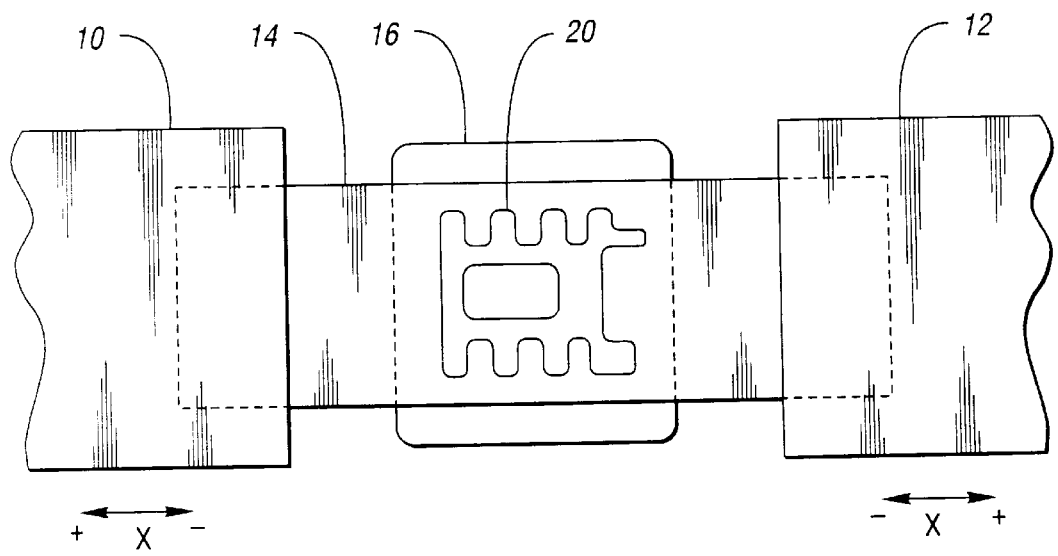
FIG. 2 shows a plan view of the prior art stretch forming operation shown in FIG. 1.

FIG. 2 is a plan view of the stretch forming operation shown in FIG. 1. As shown, the jaws 10, 12 hold the material 14 to stretch the material across the die 16. Also shown is a typical outline of a detail part 20 formed from a rectangular piece of sheet stock 14.

Figure 3:
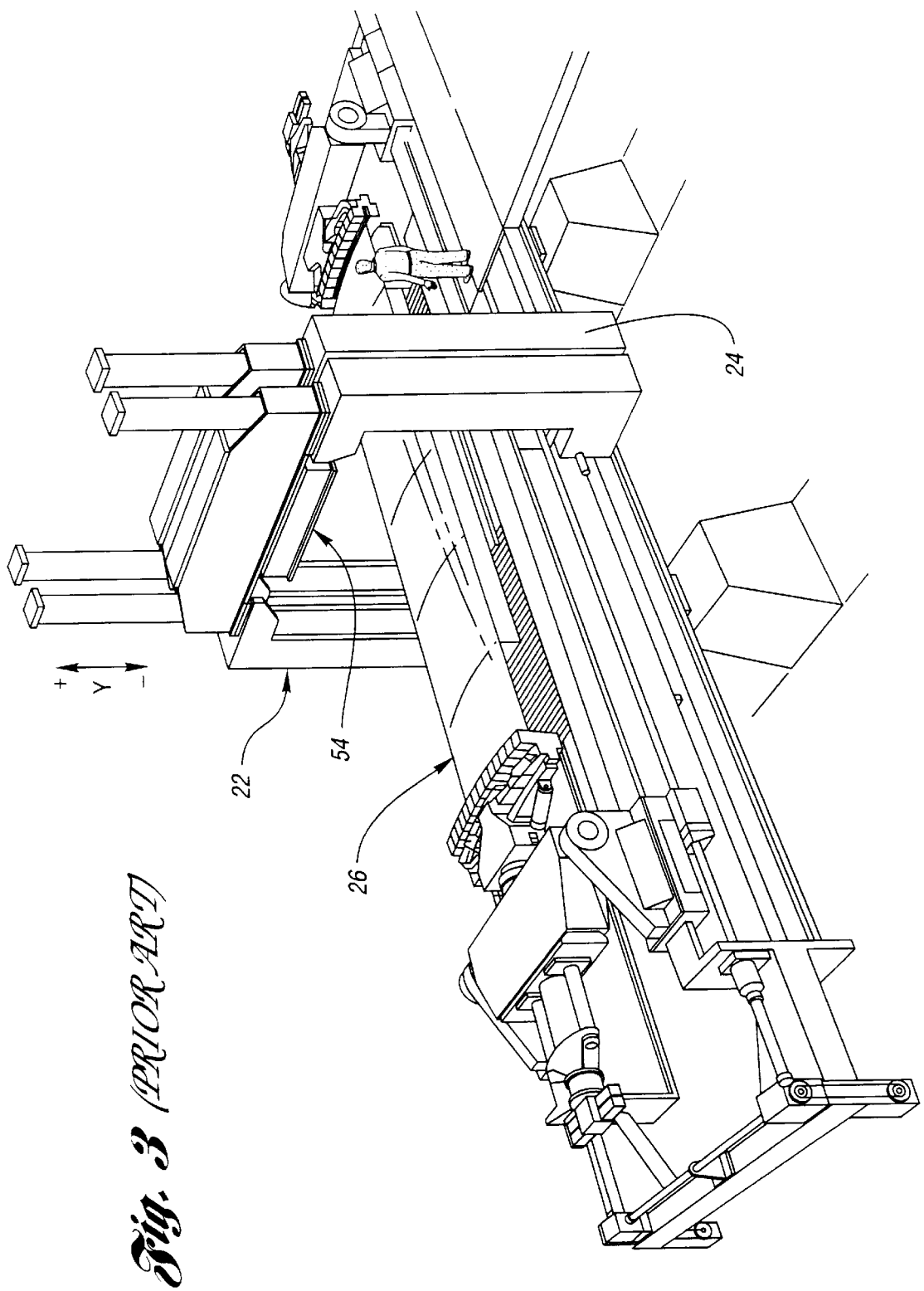
FIG. 3 shows a perspective view of a prior art stretch press.

Referring to FIG. 3, a perspective view of a prior art NAS 930 type 2 stretch press is shown. Specifically, FIG. 3 shows a model L-1000 manufactured by L & F Industries of Huntington Park, Calif., having dual gantry bulldozers 22, 24. A raw sheet stock 26 is shown being formed into a typical shape of a large aircraft fuselage skin. The bulldozers 22, 24 shown are typically used for holding and moving upper halves of two-piece stretch formed dies.

The present invention takes advantage of the bulldozers 22, 24 to perform the shearing or blanking operation of the stretch form and shear operation.

FIG. 3 shows gantry bulldozers 22, 24 as an integral part of the machine, however, the present invention contemplates the use of roll away bulldozers as well. The bulldozers 22, 24 supply force and motion in the y-direction shown in FIG. 3. The ability of the bulldozers 22, 24 to blank instead of shear would depend on their structural design and the design of the hydraulic system. As described below, shearing rather than blanking substantially reduces the force of the bulldozers 22, 24 needed in the -y direction. The present invention contemplates preferably shearing for reduced force requirements, however, blanking is contemplated with the present invention as well.

Figure 4:
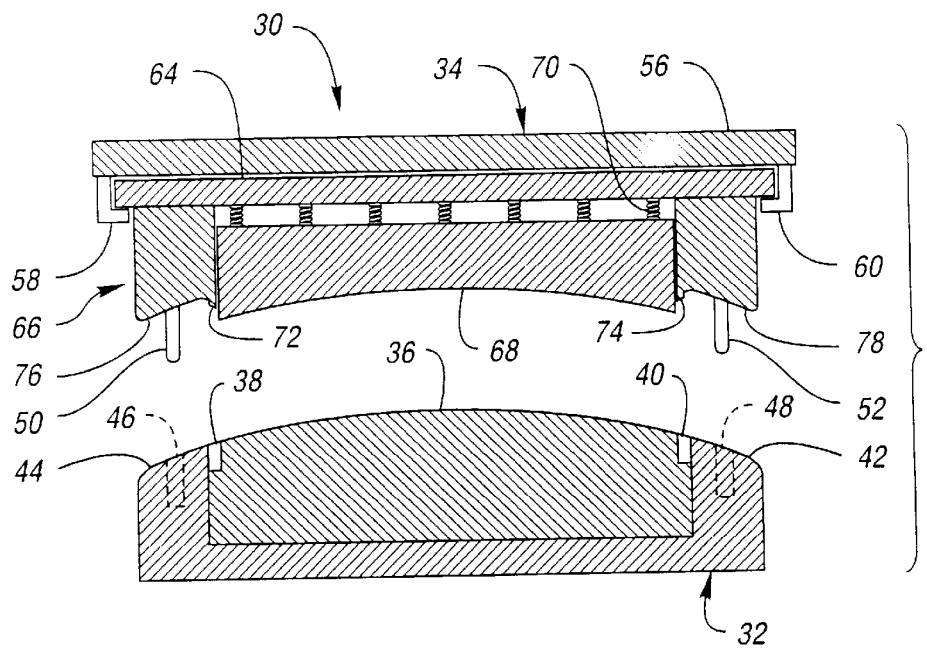
FIG. 4 shows a vertical cross-sectional view of a stretch-forming and shearing apparatus in accordance with the invention.

FIG. 4 is a cross-sectional elevation view of the stretch form and shearing die 30 in accordance with the present invention. The combined stretch form and shearing die 30 consists of a lower half 32 and an upper half 34. The lower half 32 includes a detail portion 36, a trough 38, 40 to allow the shearing or blanking operation to occur, and an access area 42, 44 which is required to form the part. The excess area 42, 44 on the lower half allows for a smooth transition between the raw stock excess and the detail portion 36.

The lower die half 32 also includes holes 46, 48 which are operative to accept the tapered guide pins 50, 52 of the upper die half 34. In this manner, the holes 46, 48 and tapered guide pins 50, 52 are operative as first and second alignment features for aligning the upper die half 34 with respect to the lower die half 32. An alternative alignment feature to guide pins would be guide rods and angle plates. Regardless, the intention of the guide pin holes 46, 48 is to maintain a proper spacial relationship between the upper half 34 and lower half 32 of the die 30, and accommodate for deviation in the position of the bulldozers 22, 24, shown in FIG. 3, relative to the die table 18, shown in FIG. 1.

The present invention contemplates that the bulldozers 22, 24 shown in FIG. 3 would be positioned in a manner straddling the stationary support 18 shown in FIG. 1, similar to the configuration shown in FIG. 3. The upper die half 34 is attached to the vertically movable portion 54 of one of the bulldozers 22, 24, shown in FIG. 3.

Returning to FIG. 4, the upper die half 34 includes a die mounting plate 56 with die keeper blocks 58, 60. The die keeper blocks 58, 60 retain the floating mounting plate 64 of the floating portion 66 of the upper die half 34. The floating mounting plate 64 is allowed to slide laterally within the die keeper blocks 58, 60 so that the floating portion 66 of the upper die half 34 may slide laterally for proper positioning as the guide pins 50, 52 enter the holes 46, 48 of the lower die half. The floating portion 66 of the upper die half 34 includes a movable detail portion 68 which is spring loaded away from the floating mounting plate 64 by the spring(s) 70 so that the movable detail portion 68 protrudes to be the first to engage against the sheet metal workpiece to hold the sheet metal workpiece in position for shearing.

The floating portion 66 also includes shearing edges 72, 74 and excess areas 76, 78.

Figure 5:
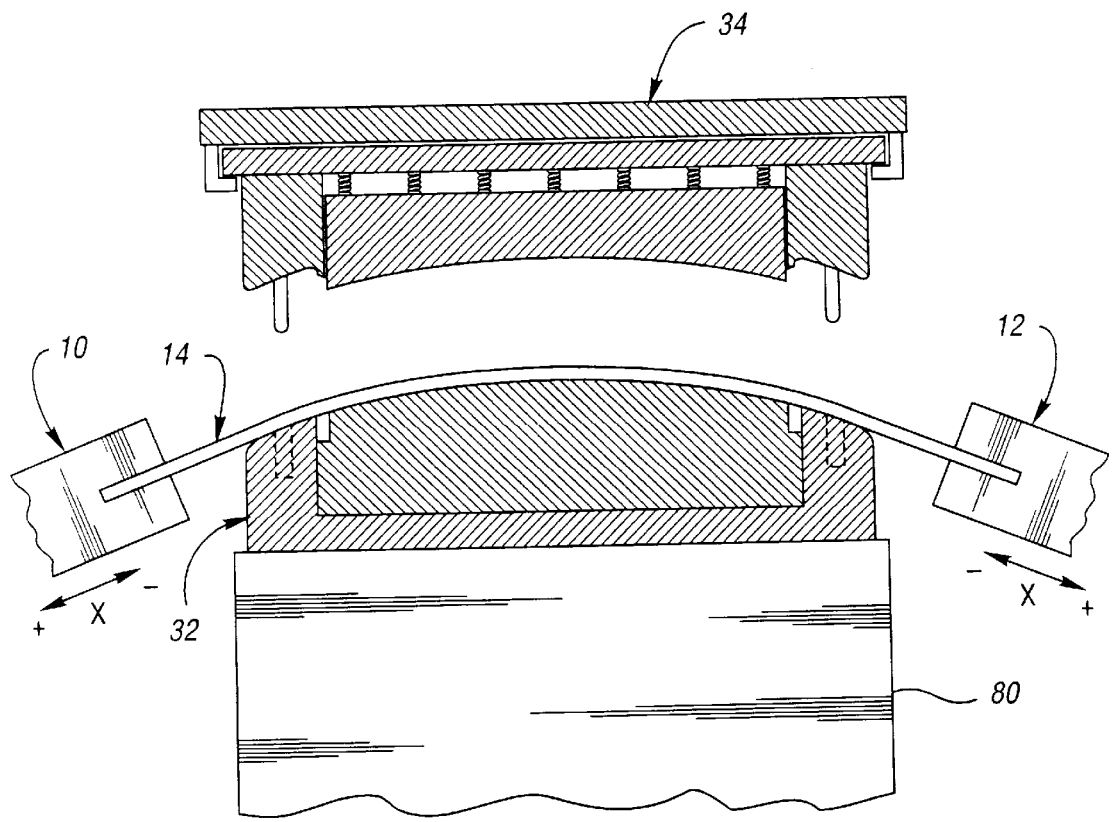
FIG. 5 shows a vertical cross-sectional view of the apparatus of FIG. 5 including a sheet metal workpiece stretched across the die.

FIG. 5 shows the first step in the combined stretch forming and shearing process. The jaws 10, 12 stretch the sheet metal workpiece 14 over the lower die half 32. The lower die half 32 is supported by the die table or riser 80 (in place of the stationary support 18 shown in FIG. 1). A load is applied to the sheet metal workpiece 14 in the plus x direction by the jaws 10, 12 across the lower die half 32. This is the stretch forming portion of the cycle. The load is then relaxed, allowing the jaws 10, 12 to move in the -x direction, greatly reducing the load on the sheet stock 14.

Figure 6:
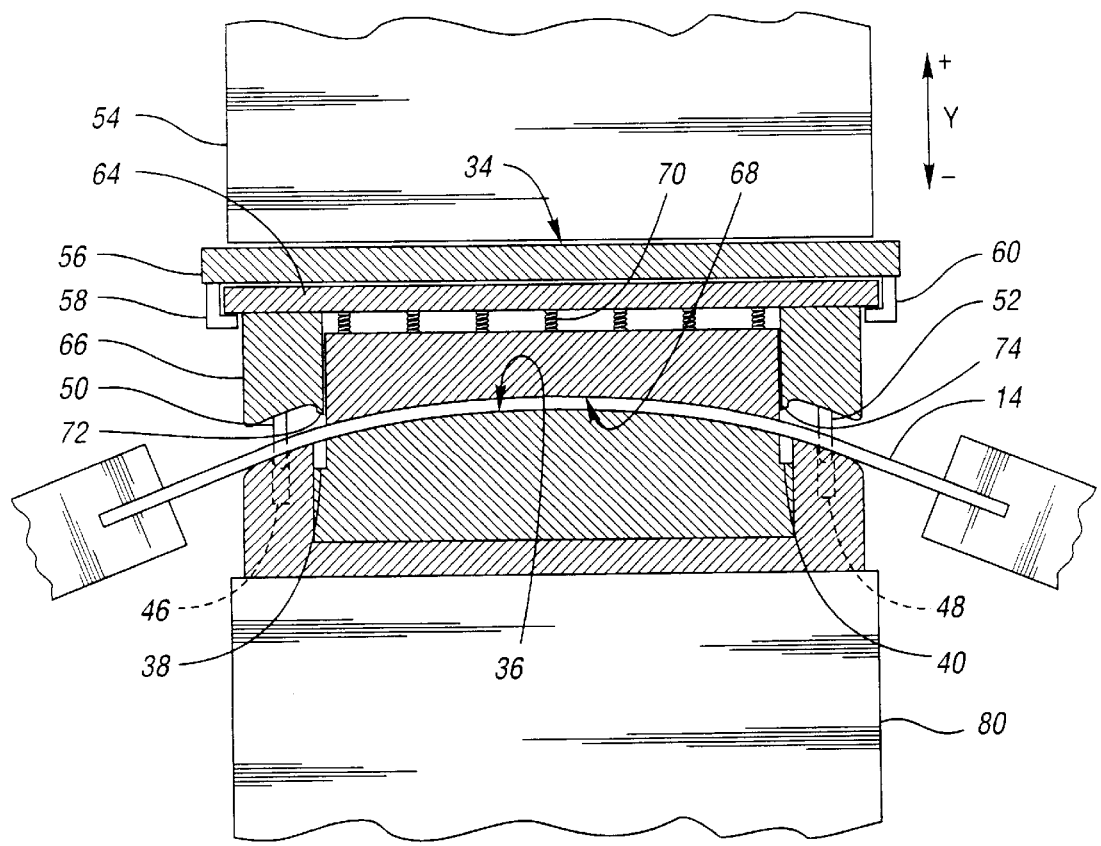
FIG. 6 shows a vertical cross-sectional view of the apparatus of FIG. 5 with the die in the closed position.

In FIG. 6, the movable portion 54 of the bulldozer (such as one of the bulldozers 22, 24 shown in FIG. 3) has moved in the -y direction to engage the upper die half 34 into the lower die half 32. The guide pins 50, 52 in the upper die half 34 enter the guide pin holes 46, 48 in the lower die half 32. From when the guide pins 50, 52, which are tapered, first enter into the guide pin holes 46, 48, until the guide pins 50, 52 have reached the full diameter engagement, the floating mounting plate 64 may move relative to the die mounting plate 56, within the limits of the keeper blocks 58, 60. The floating mounting plate 64, keeper blocks 58, 60, and die mounting plate 56 allow the floating portion 66 of the upper die half 34 to move relative to the movable portion of the bulldozer 54, and therefore, preclude the combination die from failing due to misalignment between the bulldozer (such as bulldozers 22, 24 shown in FIG. 3) and the die table 80 of the press.

The upper half detail portion 68 traps the workpiece 14 against the lower half detail portion 36, and a small load is applied via the springs 70. The vertically movable portion 54 of the bulldozer continues to move in the -y direction. The shearing edges 72, 74 then shear the sheet metal workpiece 14, engaging the lower die half 32 in the trough 38, 40.

Figure 7:
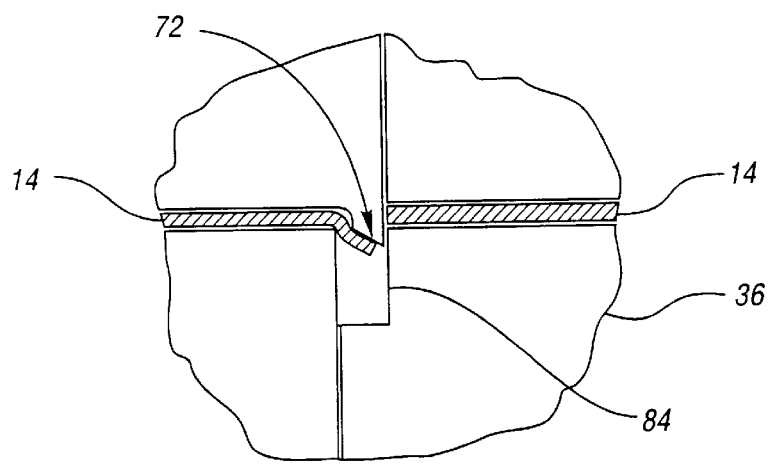
FIG. 7 shows an enlarged schematic cross-section detail taken from FIG. 6.

FIG. 7 shows an enlarged view of the shearing area. The detail contour is removed to simplify the view. The shearing portion 84 of the lower die half detail portion 36 cooperates with the shearing edge 72 of the upper die half 34 to shear the workpiece 14. This is preferably a scissors-type shearing action. The shearing portion 84 of the lower die half 32 also defines the net periphery of the detail part 88. This part 88 is shown in FIG. 8.

Once the shearing edge 72 has fully penetrated the raw sheet stock 14, then the movable portion 54 of the bulldozer can be retracted, or move in the +y direction, shown in FIG. 3. In order to prevent the shearing edge 72, 74 from over-penetrating the trough 46, 48 and damaging the die, stop blocks and corresponding stop pads (not shown) are included. The stop blocks allow the upper die half 34 to bottom out against the lower die half 32 without further travel or damage therebetween.

Figure 8:
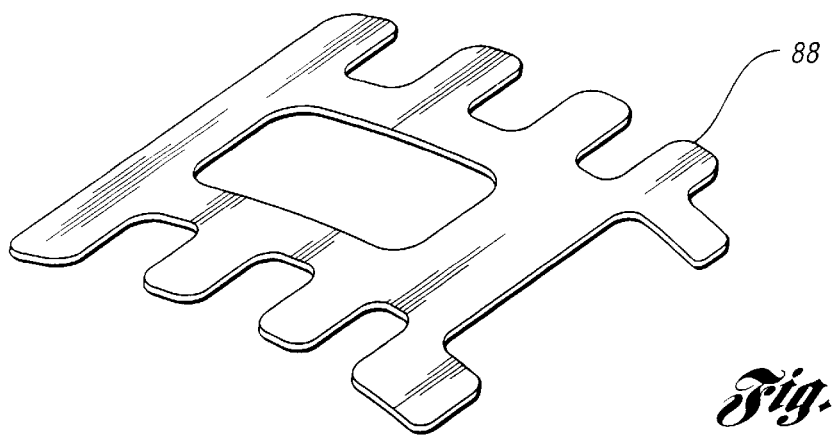
FIG. 8 shows a perspective view of a part manufactured in accordance with the present invention.

FIG. 8 shows the resultant detail part 88, fully and permanently formed and trimmed to the desired contour and periphery.

Referring to FIGS. 9–12, alternative shearing configurations are shown. As mentioned above, the workpiece 14 may be blanked by the die described herein, however, the blanking process requires significant force. The shearing process will cut across the material similar to a pair of scissors, whereby only a small portion of the material is actually being cut at one time, reducing the force required to cut. For shearing, the upper blade 72 is not parallel to the bottom blade 84.

Figure 9:
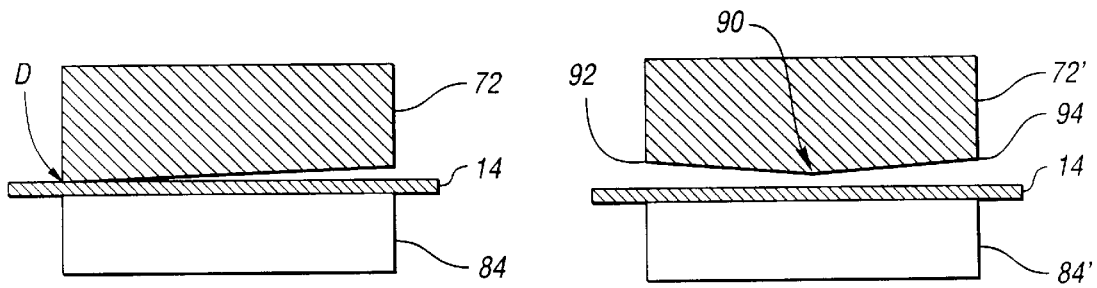
FIG. 9 shows a schematic vertical cross-sectional view of a shearing operation in accordance with the invention.
Figure 10:
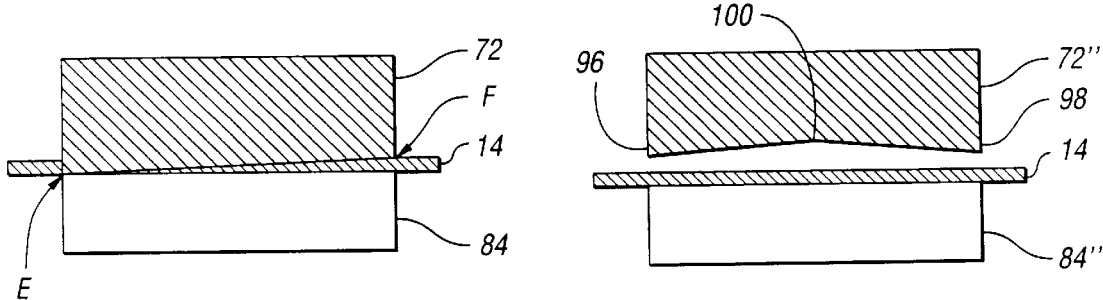
FIG. 10 shows a schematic vertical cross-sectional view of the shearing operation of FIG. 9.

As shown in FIG. 9 and 10, the upper blade 72 (shearing edge) is traveling towards the lower blade 84 (shearing portion). The upper blade first contacts the material 14 at point D. For this example, the shear angle is equal to the material thickness, so that the upper blade 72 is still material thickness away from contacting the lower blade 84 at the opposite end from D at initial engagement. When the upper blade 72 has just traveled fully past the metal piece to be sheared 14, as shown at point E, then the upper blade 72 will also just begin shearing at the opposite end, or point F, shown in FIG. 10.

Figure 11:
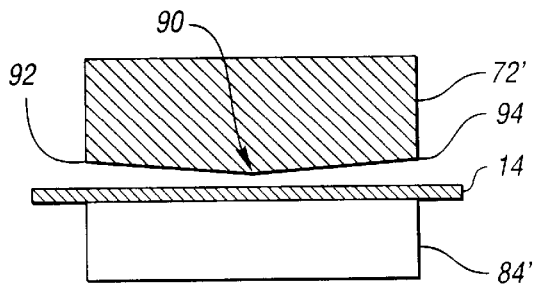
FIG. 11 shows a schematic vertical cross-sectional view of an alternative shearing configuration.
Figure 12:
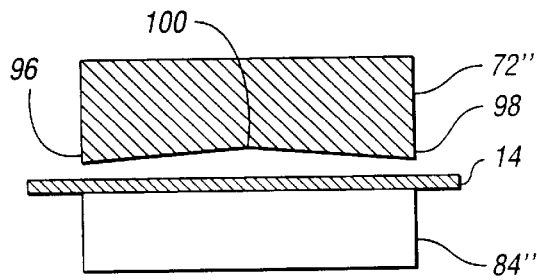
FIG. 12 shows a schematic vertical cross-sectional view of a further alternative shearing operation in accordance with the invention.

FIGS. 11 and 12 schematically show alternative shearing embodiments. The embodiment of FIG. 11 shows a V-shaped blade 72' which shears the workpiece 14 against the lower shearing portion 84' starting at the point 90 and cutting outward toward the peripheral edges 92, 94. FIG. 12 shows a reverse V-shaped upper shearing edge 72" which cuts the workpiece 14 against the lower sharing portion 84" starting from the peripheral edges 96, 98, and cutting toward the center 100.

While the best mode for carrying out the invention has been described in detail, those familiar with the art to which this invention relates will recognize various alternative designs and embodiments for practicing the invention within the scope of the appended claims.

What is claimed is:

1. A method of forming and shearing a sheet metal workpiece, comprising:

providing a stationary lower die half;

stretching the workpiece over the lower die half to stretch-form the workpiece;

providing a vertically movable upper die half including a laterally movable floating portion with a shearing edge;

supporting the floating portion along its peripheral edges with die keeper blocks;

moving the upper die half toward the lower die half;

moving the floating portion laterally by sliding the peripheral edges along the die keeper blocks as the upper die half is moved toward the lower die half in order to properly align the floating portion with the lower die half; and shearing the stretch formed workpiece between the shearing edge and the lower die half as the upper die half moves toward the lower die half.

2. The method of claim 1, further comprising engaging a vertically movable portion of the upper die half with the workpiece to hold the workpiece in place prior to the shearing step.

3. The method of claim 2, further comprising spring loading the vertically movable portion of the upper die half toward the workpiece prior to the shearing step.

4. An apparatus comprising:

a stationary support;

a lower die half secured to the stationary support and having a first alignment feature;

first and second jaws positioned on opposing sides of the lower die half for grasping opposing edges of a sheet metal workpiece, wherein at least one of said jaws is movable for stretch-forming the workpiece over the lower die half;

a bulldozer straddling the stationary support, said bulldozer having a vertically movable portion; and an upper die half connected to the vertically movable portion, said upper die half including a die mounting plate and opposing keeper blocks fixed to the vertically movable portion and a floating portion laterally movable with respect to the die mounting plate along the keeper blocks, said floating portion including a floating mounting plate supported along its peripheral edges by said keeper blocks, and said floating portion having a second alignment feature engageable with the first alignment feature for moving the floating portion laterally for properly aligning the upper and lower die halves as the movable portion moves the upper die half toward the lower die half, and wherein said floating portion includes a shearing edge cooperable with a shearing portion of the lower die half for shearing the workpiece, wherein said upper die half includes a contoured part detail area which is vertically movable with respect to the floating portion and spring loaded away from the floating portion to hold the workpiece in position for shearing.

5. The apparatus of claim 4, wherein said shearing edge is tapered with respect to the shearing portion of the lower die half to facilitate a gradual, scissors-type shearing of the workpiece, thereby minimizing force required for shearing.

6. The apparatus of claim 5, wherein said lower die half includes a trough formed therein for receiving the shearing edge.

7. The apparatus of claim 4, wherein the first alignment feature comprises at least one hole formed in the lower die half and the second alignment feature comprises at least one tapered pin engageable with the hole.

8. The apparatus of claim 5, wherein said shearing edge is tapered in a reverse V-shape such that outer portions of the shearing edge contact the workpiece first.

9. The apparatus of claim 5, wherein said shearing edge is tapered in a V-shape such that a center portion of the shearing edge contacts the workpiece first.

10. The apparatus of claim 4, wherein said bulldozer is portable.

11. An apparatus comprising:

a stationary support;

a lower die half secured to the stationary support and having a first alignment feature;

first and second jaws positioned on opposing sides of the lower die half for grasping opposing edges of a sheet metal workpiece, wherein said jaws are movable for stretch forming the workpiece over the lower die half;

a vertically movable upper die half spaced above the lower die half, said upper die half including a die mounting plate and a floating portion laterally movable with respect to the die mounting plate, said floating portion having a second alignment feature engageable with the first alignment feature for moving the floating portion laterally for properly aligning the upper and lower die halves as the upper die half moves toward the lower die half, and wherein said floating portion includes a shearing edge which is tapered with respect to a shearing portion of the lower die half to facilitate a gradual, scissors type shearing of the workpiece, thereby minimizing force required for shearing, wherein said shearing edge is tapered in a reverse V-shape such that outer portions of the shearing edge contact the workpiece first.

12. The apparatus of claim 11, wherein said lower die half includes a trough formed therein for receiving the shearing edge.

13. The apparatus of claim 11, wherein said upper die half includes a contoured part detail area which is vertically movable with respect to the floating portion and spring loaded away from the floating portion to hold the workpiece in position for shearing.

14. The apparatus of claim 11, wherein the first alignment feature comprises at least one hole formed in the lower die half and the second alignment feature comprises at least one tapered pin engageable with the hole.

15. The apparatus of claim 11, further comprising a bulldozer straddling the stationary support and having a vertically movable portion for moving the upper die half.

16. An apparatus comprising:

a stationary support;

a lower die half secured to the stationary support and having a first alignment feature;

first and second jaws positioned on opposing sides of the lower die half for grasping opposing edges of a sheet metal workpiece, wherein said jaws are movable for stretch forming the workpiece over the lower die half;

a vertically movable upper die half spaced above the lower die half, said upper die half including a die mounting plate and a floating portion laterally movable with respect to the die mounting plate, said floating portion having a second alignment feature engageable with the first alignment feature for moving the floating portion laterally for properly aligning the upper and lower die halves as the upper die half moves toward the lower die half, and wherein said floating portion includes a shearing edge which is tapered with respect to a shearing portion of the lower die half to facilitate a gradual, scissors type shearing of the workpiece, thereby minimizing force required for shearing, wherein said shearing edge is tapered in a V-shape such that a center portion of the shearing edge contacts the workpiece first.

* * * * *